Nov. 14, 1961 J. E. FLOOD 3,009,019

AUTOMATIC EXCHANGE SYSTEMS

Filed Feb. 6, 1956 6 Sheets-Sheet 1

Inventor
JOHN EDWARD FLOOD
By
Attorney

Inventor
JOHN EDWARD FLOOD
By
Attorney

Nov. 14, 1961 J. E. FLOOD 3,009,019

AUTOMATIC EXCHANGE SYSTEMS

Filed Feb. 6, 1956 6 Sheets-Sheet 3

Inventor

JOHN EDWARD FLOOD

By

Attorney

AUTOMATIC EXCHANGE SYSTEMS

Filed Feb. 6, 1956 6 Sheets-Sheet 4

Inventor
JOHN EDWARD FLOOD
By
Attorney

Inventor
JOHN EDWARD FLOOD
By
Attorney

Inventor
JOHN EDWARD FLOOD
By
Attorney 3,009,019
Patented Nov. 14, 1961

3,009,019

AUTOMATIC EXCHANGE SYSTEMS

John Edward Flood, London, England, assignor, by mesne assignments, to Siemens Edison Swan Limited, London, England, a British company Filed Feb. 6, 1956, Ser. No. 563,734
5 Claims. (Cl. 179—7)

Figure 1:
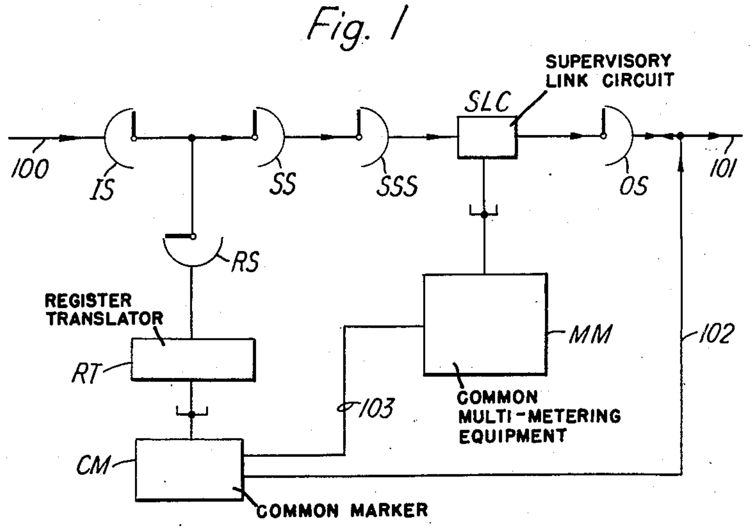

This invention relates to automatic exchange systems such as automatic telephone exchange systems. In one aspect, it has in view the provision of improved multi-metering arrangements in such systems. In another aspect, it has in view the provision of an improved subtraction circuit arrangement which finds a useful application in connection with these improved multi-metering arrangements.

In automatic exchange systems of the kind in which paths through an exchange are selected one at a time with the aid of a common marker, the selection of a through path for a call is generally effected in two phases, (*a*) a marking phase in which all free paths between a central switching point, to which the calling subscriber is initially automatically extended, and the wanted outgoing line, are marked, and (*b*) an appropriation phase in which one of the free marked paths is appropriated for the call in question. Generally both the marking and appropriation are effected by applying momentary signals to the path, the marking signal being applied to one terminal of all the free paths and the appropriation signal being applied to another terminal of the appropriated path. In certain marker systems however the appropriation signal may be a continuous "forward hold" signal applied from the said central switching point. Also it is usual to arrange that the marker is released as soon as the path between the calling and called subscribers is completely set up, ringing being applied to the called subscriber's line from supervisory equipment included in the path. Upon the called subscriber answering a "backward hold" signal is applied to the path to trip the ringing, initiate metering and establish through conversational conditions in the path.

To effect multi-fee metering in an exchange of the above kind, the most economical arrangement obtains when the common marker is used to determine the fee to be charged for a call. When this is done however, because the common marker is released before the called subscriber answers, it is necessary to have a storage equipment available to relieve the marker of the metering information in order that the marker may be released from the connection without delay.

Arranging that the common marker indicated the fee by applying, during the marking phase referred to, additional markings at the point at which it applies the marking to indicate the free paths, would require too many circuits through the switching ranks intervening between the said point and the storage equipment (i.e. if the fee is indicated over a number of wires on a code basis), or would take too long (i.e. if the fee is indicated over a single circuit by a train of impulses). For this reason it is desirable for the marker to indicate the fee to be charged directly to storage equipment associated with the path to be used for a call. This, however, leads to a difficulty in that since the common marker has no means of knowing which of the marked free paths has been appropriated, it has no means of knowing which storage equipment should receive the fee indication.

A similar difficulty may arise in connection with automatic exchange systems of the kind in which connections are set up in a step-by-step manner with the aid of registers and a common translator. To effect multi-metering in an exchange of this kind, an economical arrangement obtains when the common translator is used to determine the fee to be charged for a call. Because the common translator cannot be held for long, it then becomes desirable for the common translator to indicate the fee to be charged directly to storage equipment associated with the path taken into use for a call, but the difficulty may arise that the common translator has no means of knowing which storage equipment should receive the fee indication.

According to a main feature of the present invention, a common marker or translator has associated with it a multi-compartment storage device having a plurality of effectively separate storage compartments in each of which a number of different items of information can be stored, there being at least one such storage compartment for each path through the exchange, and metering information from the common marker or translator in respect of a call is stored in a storage compartment selected, as pertaining to the particular path appropriated for the call, as the consequence of the receipt, in gating circuit arrangements connected between the common marker or translator and the multi-compartment storage device, of one or more signals constituting a momentary signal condition indicative of the said particular path. In an automatic exchange system of the kind having a common marker, the said momentary signal condition may be constituted by a momentary appropriation signal if such is provided, or it may be constituted by the coincidence of a momentary marking signal and a continuous appropriation signal of the "forward hold" type. In an automatic exchange of the kind having a common translator, the said momentary signal condition may be constituted by a momentary marking signal extended from the register taken into use for the call when this register obtains the use of the common translator. In the embodiments of the invention which are especially contemplated, the multi-compartment storage device has at least one storage compartment for each of a plurality of supervisory link circuits.

Storage compartments of the multi-compartment storage device may be associated with the respective paths through the exchange by means of a time-division-multiplex system, a particular storage compartment being actively associated with the common marker or translator, to receive metering information therefrom, in response to the occurrence, during a time period allocated to this compartment, of the momentary signal condition indicative of the particular path to which this compartment pertains.

In the preferred embodiments of the invention, the multi-compartment storage device takes the form of a so-called magnetic storage drum and a digression will now be made for the purposes of explaining the general construction and principles of operation of a typical magnetic storage drum.

A magnetic storage drum consists of a cylinder whose outer surface is coated with a magnetic material. By rotating the drum past magnetic writing heads magnetic patterns can be imposed on the surface along tracks round its periphery by current pulses passed through the windings of the heads. Information thus written on the drum can subsequently be read by reading heads in whose windings E.M.F.'s are produced by the magnetic patterns already imposed on the tracks. The simplest method of storing information on the drum is in the form of binary digits since this requires only two states of magnetisation the material being magnetised in one direction or the other. To enable information stored on the drum to be modified or erased as required, the method of storage employed is to pass the information from the read head back to the write head over a circuit external to the drum;

the drum thus forming part of a circulating system similar to that used in the case of delay line storage, and the external circuit containing control equipment for effecting modification or erasure of the stored information.

Arrangements employing magnetic drum storage devices have already been proposed. In telecommunication systems for example it has been proposed to employ magnetic drum storage arrangements in register translator equipment to store the digits of a wanted subscriber's number. One general method of doing this is to synchronise a time division multiplex system from the rotating drum and to allocate a time period in this multiplex to every line served by the drum. By this means successive segments of the drum between the write and read heads in effect form storage compartments which can be allocated one to each of the lines served by the drum, and as previously explained this information is caused to circulate from the write to the read head of the drum and through an external circuit back to the write head and so on. Because of the distorted shape of the output wave form from the read head, its peak occurs before the peak of the input wave form and it has been proposed to make use of this phenomenon to enable a single head to serve both for writing and reading and thus enable the whole periphery of the drum to be used for storage.

For the utilisation of the binary digits stored on the drum, the principle of subtraction is sometimes employed, the rule being to subtract 1 successively from the binary number until this has been reduced to zero when the total of successive 1's subtracted equals the number equivalent to the binary digits. For example, take the binary number

| | |
|---|---|
| | 111=7 |
| subtract 1, | 1 |
| | 110=6 |
| " 1, | 1 |
| | 101=5 |
| " 1, | 1 |
| | 100=4 |
| " 1, | 1 |
| | 011=3 |
| " 1, | 1 |
| | 010=2 |
| " 1, | 1 |
| | 001=1 |
| " 1, | 1 |
| | 000 |
| Total subtractions | 7 |

The arrangement generally adopted is to provide a subtraction circuit in the storage circulation circuit external to the drum. This may be controlled by means of a time division multiplex synchronised with the drum to operate upon a particular digit which is passing round the storage circuit, subtracting 1 from the binary number each time it arrives at the subtraction circuit, the result of the subtracting being passed on to the writing head and an impulse being passed to a utilisation circuit to effect a count of 1 for each subtraction effected, the process being continued until the binary number stored has been reduced to zero.

The elements of a binary number may be stored serially on one track of the magnetic storage drum, i.e. displaced from one another round the drum, or the elements may be stored in parallel, with each element occupying a separate track, i.e. displaced from one another across the drum.

With the parallel method of storage mentioned above the subtraction circuit has to be able to scan all the tracks utilised in the storage of a binary number to determine when the number has been reduced to zero. With the serial method of storage there is greater difficulty since the subtraction circuit cannot detect that the binary number has been restored to zero until the last element of the binary number has been received by which time a subtracting operation will already have been effected and a decimal counting impulse will have been wrongly transmitted. One solution to this difficulty which has been proposed is to place a delay line either in front of or behind the subtraction circuit, the delay of the line being sufficient to accommodate all the elements of the binary number so that these can be scanned by the subtraction circuit and thus enable it to know when the binary digit is at zero. Another possibility is to use an auxiliary head on the drum, in place of the delay line, the auxiliary head being spaced one storage compartment in front of the main reading head, so that all the elements will be read at the auxiliary reading head before the first digit enters the subtraction circuit from the main reading head.

As regards the application of the present invention to simple multi-metering of untimed calls, i.e. where the calling subscriber's meter is operated one or more times, according to the fee to be charged, at the start of the call and irrespective of the ensuing duration of the call, the magnetic drum storage arrangements proposed follow generally the lines of the known arrangements described above. According to another aspect of the present invention, however, there is provided an improved subtraction circuit arrangement whereby the attainment of zero of the binary digit stored as a result of the successive subtracting operations is made more readily recognisable by the subtraction circuit and in the case of serial storage avoids the need for auxiliary reading heads or other additional apparatus.

According to this aspect of the invention information is stored on a magnetic storage drum or like storage device according to a modified form of the binary code. According to this modified binary code the number of elements required to express a decimal number in binary form is increased by one element, the additional element always representing either "0" or the numeral "1" while the remainder of the elements represent in binary form the number to be stored minus 1. The additional element of the code is treated, as regards storage on the drum as the last element of an unmodified binary code (i.e. the number 6 would be stored as 1+101) and the subtraction process is allowed to proceed as though the whole of the number stored were in binary form (i.e. 1101=13). The circuit of the subtraction circuit is however so arranged that after the additional element of the code has been changed from "1" to "0" in the course of the subtraction process, the channel containing this element is diverted from the subtracting elements of the subtracting circuits and is thus prevented from being changed from "0" back to "1," and also so arranged that an impulse can be passed from the subtraction circuit to a utilisation circuit only as long as the additional element of the code stored on the storage drum remains "1." Thus in the case of parallel storage it is only necessary for the circuit to observe the change of the additional element of the code from "1" to "0" to know that the original number stored has been sent out while in the case of serial storage the same facility is provided it being only necessary to delay transmission of the impulses to be counted in the utilisation circuit until the additional element has been received in the subtraction circuit.

In the application of the subtraction circuit arrangements described above to the arrangements of the present invention for the multi-metering of untimed calls, the subtracting elements of the subtraction circuit are arranged to be dependent for their operation on receipt of a backward hold signal via the time division multiplex system. The subscriber's meter to be operated constitutes the digit utilisation means and this is operated directly from the subtraction circuit via a time channel of the time division multiplex corresponding to the line to which the meter belongs, and a suitable pulse lengthening circuit.

Besides providing the facility of multi-metering of untimed calls, the present invention also includes arrangements for the multi-metering of calls on a timed basis, the calling subscriber's meter being operated one or more times periodically (e.g. once every minute) throughout the duration of a call. As in the case of metering on an untimed basis, the metering of calls on a timed basis must be initiated upon the reply of the called subscriber, but in the case of a timed call it is usually desirable to continue the metering as long as the calling subscriber holds the line irrespective of whether the called subscriber remains engaged on the call or not, i.e. metering must be initiated by the appearance of the backward hold signal but when initiated should continue as long as the forward hold signal persists.

Figure 2:
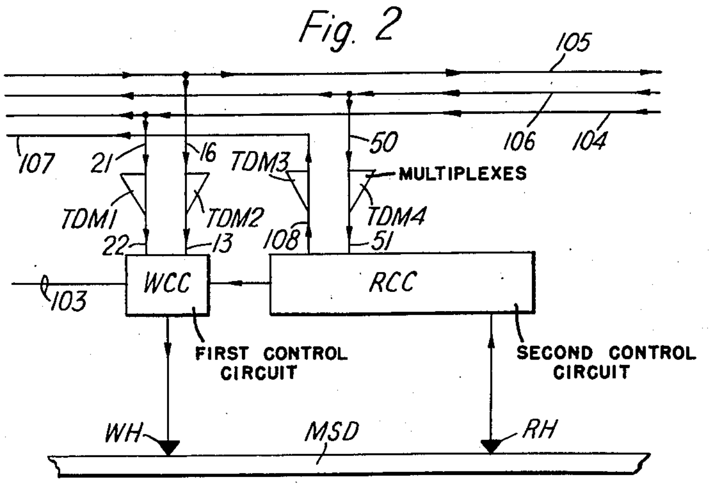
Figure 3:
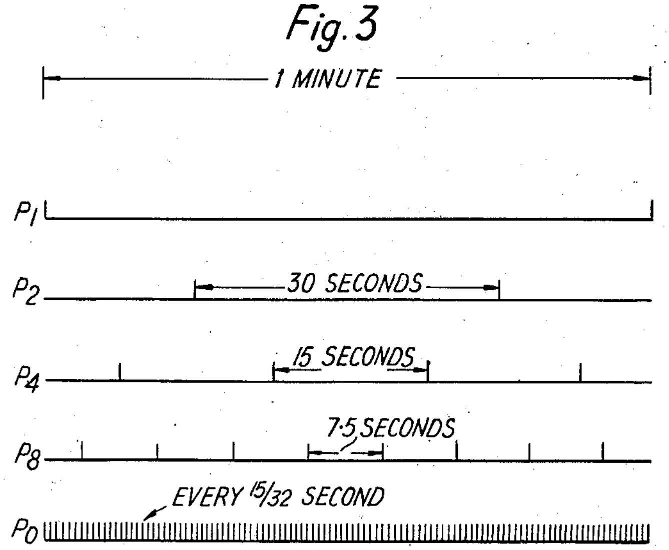
Figure 6:
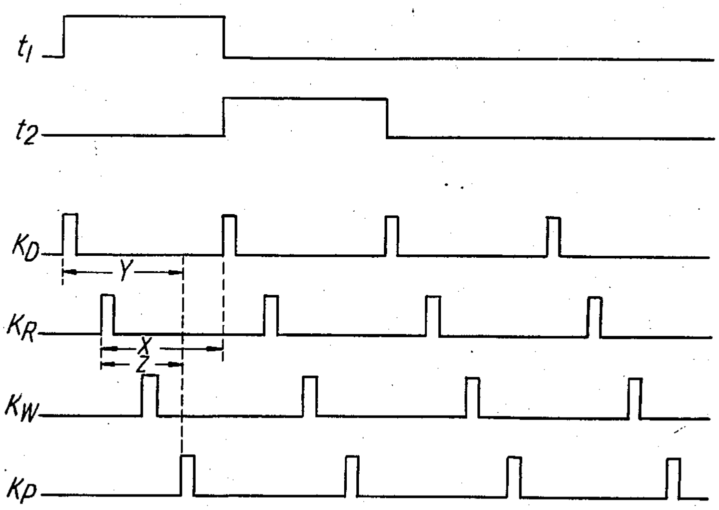
Figure 4A:
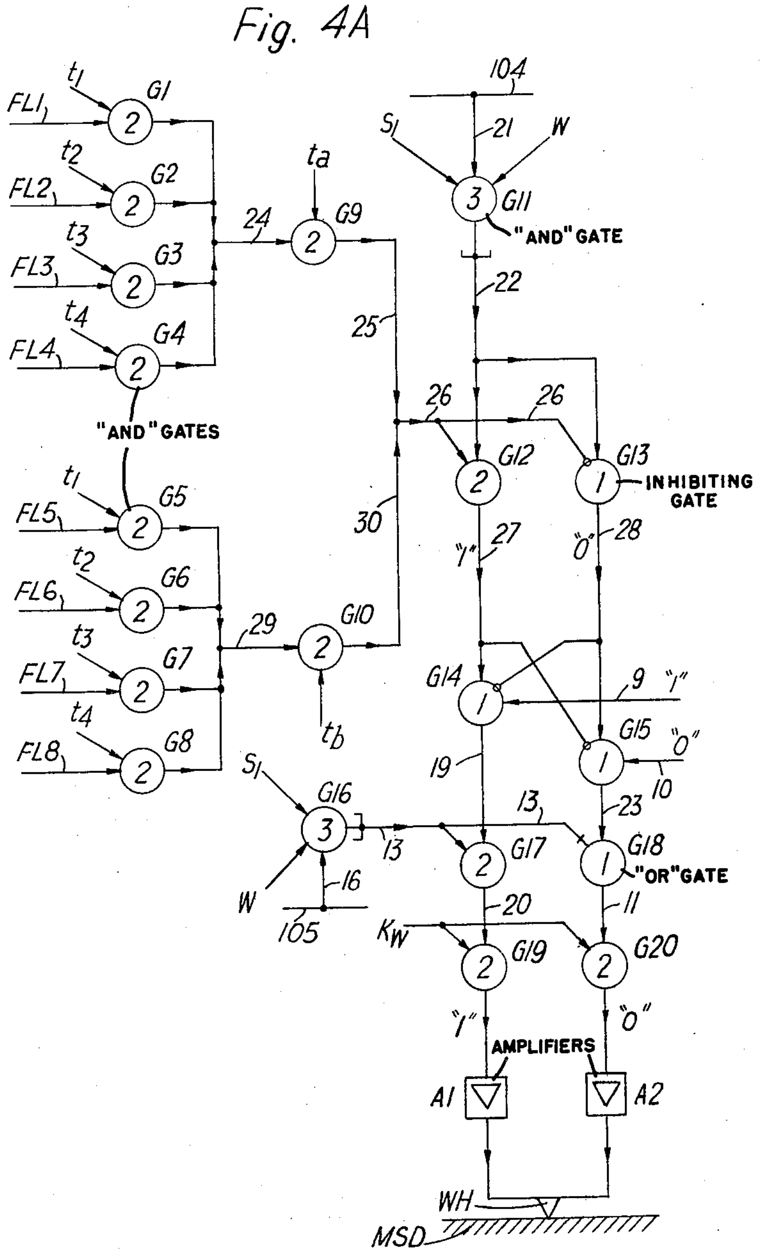
Figure 4B:
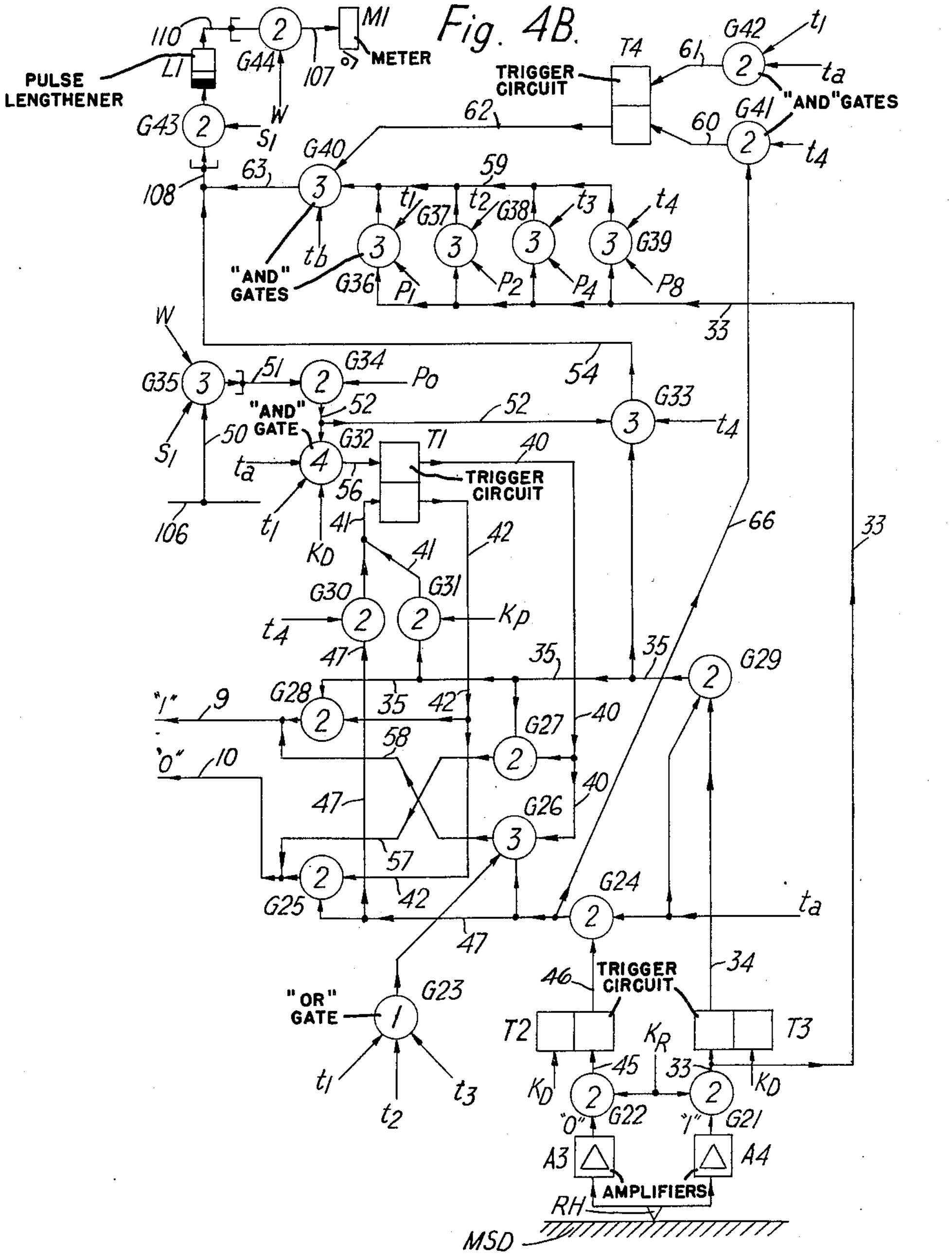
Figure 5:
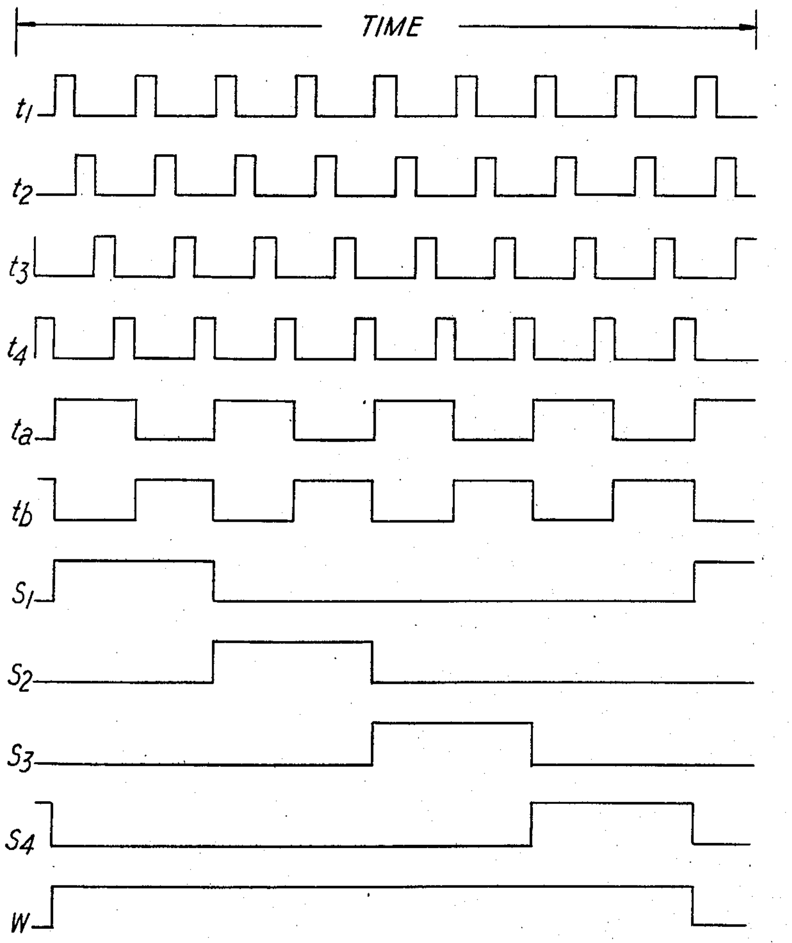
Figure 7:
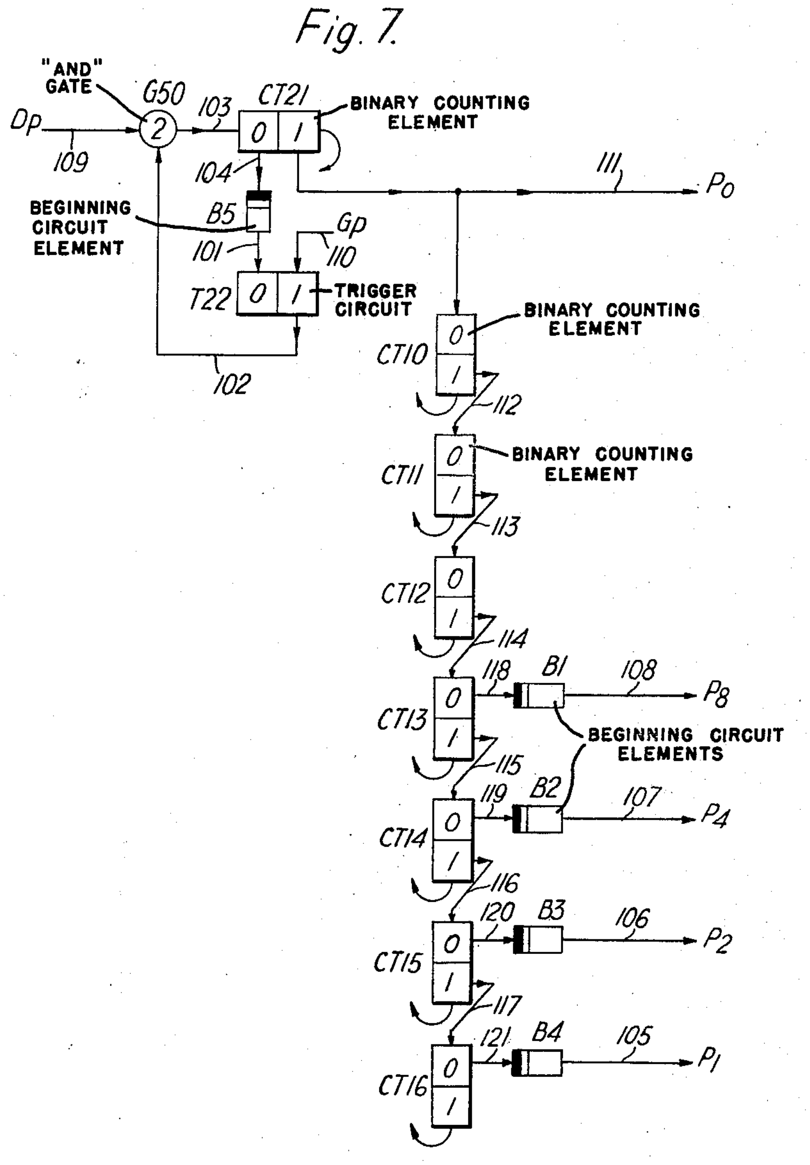

The features of the invention are exemplified in the specific multi-metering arrangements in accordance with it which will now be described with reference to the accompanying drawings. FIG. 1 of the drawings is a schematic trunking diagram of an automatic telephone exchange incorporating the multi-metering arrangements concerned, FIG. 2 is a schematic diagram showing the general character of the multi-metering arrangements, and FIG. 3 is a pulse waveform diagram showing how the pulses of five different trains of regularly recurring metering pulses supplied to the multi-metering arrangements are timed. FIGS. 4A and 4B together constitute a schematic diagram, of the so-called functional type, showing the constitution and organisation of the multi-metering arrangements, and FIGS. 5 and 6 are pulse waveform diagrams showing how the pulses of various trains of regularly recurring control pulses supplied to the multi-metering arrangements are timed. FIG. 7 is a schematic diagram, of the so-called functional type, showing the constitution and organisation of the pulse generator used for supplying the pulse trains shown in FIG. 3.

Referring firstly to the schematic trunking diagram of FIG. 1, the automatic telephone exchange concerned is one employing electronic switches. For convenience, each electronic switch is represented in the figure by the same conventional representation (wiper and contact arc) as has been employed in the past for a switch of the electromechanical type. A through connection between a trunk 100, individual to a calling local subscriber's line or to a calling incoming junction, and a trunk 101, individual to a called local subscriber's line or to a called outgoing junction, is established by way of an incoming switch IS, a first selecting switch SS, a second selecting switch SSS, a supervisory link circuit SLC, and an outgoing switch OS. The exchange is of the kind in which through connections are set up one at a time with the aid of a single common marker CM. When a trunk 100 assumes the calling condition, a connection from it to a register-translator RT is set up automatically by way of an incoming swtch IS and a register switch RS. When it has received the digits indicating the required destination of the call, the register-translator RT performs the necesstry translation, acquires the use of the common marker CM as soon as this marker becomes available, and transfers the necessary information to this marker. The common marker CM thereupon applies a so-called backward marking to the relevant called trunk 101, or to a group of such trunks in the case where the call is one to be routed over any line of a group, by way of a backward marking wire, or wires, 102. At the same time as it applies the backward marking, the common marker CM also, where the call is one from a local subscriber and is not a free call, passes metering information to common multi-metering equipment MM over a plurality of signal wires 103. The backward marking applied by the common marker CM to a called trunk 101 is extended backwards over paths including every available path between this called trunk and the relevant incoming switch IS. A particular backward-marked path is appropriated for the call and a connection set up thereover by a selecting process in which a forward hold signal is extended forwards from the first selecting switch SS associated with the incoming switch IS concerned. The common marker CM is only held on the call for a brief time sufficient to enable the connection over a particular backward-marked path to be set up as just mentioned, and to enable the relevant metering information to be recorded in the common multi-metering equipment MM. As soon as the common marker CM is released, all backward markings in respect of the call are removed. The register-translation RT concerned is held on the call until it receives ringing tone, when it is released. In the case where the call is one to a local subscriber, ringing current is applied to the relevant called line from the supervisory link circuit SLC. Irrespective of the nature of the call, when the call is answered a backward hold signal is extended backwards over the path appropriated for the call. This backward hold signal serves to bring about the tripping of the ringing in the case where the call is one to a local subscriber, and to establish conversational conditions in the path. Where the call is one from a local subscriber and is not a free call, the common multi-metering equipment MM, in response to the appearance of the backward hold signal, causes appropriate metering pulses to be applied to the supervisory link circuit SLC for the purpose of bringing about appropriate operation of the calling subscriber's meter.

It is clearly understood that the particular trunking arrangement of FIG. 1 has been described by way of example only, and that various modifications may be made in this arrangement without rendering inapplicable the multi-metering arrangements which will be described with reference to the remaining figures.

Referring now to FIG. 2, this as has already been stated is a schematic diagram showing the general character of the multi-metering arrangements. At the top of the figure are shown four wires 104, 105, 106, and 107 which form part of a circuit between switching ranks. In the case of the particular trunking arrangement of FIG. 1, these wires would be included in a supervisory link circuit SLC, and for the sake of continuity of description it will hereinafter be assumed that these wires form part of such a link circuit. The wire 104 is a backward marking wire, the wire 105 is a forward holding wire, the wire 106 is a backward holding wire, and the wire 107 is a metering wire. The common multi-metering equipment includes a magnetic storage drum. For simplicity, it has been assumed that the number of supervisory link circuits is such as to permit the requisite storage compartments pertaining to them to be provided by a single track on this drum. All that is necessary, where this is not so, is to divide the supervisory link circuits into groups, one group per track, and to provide metering equipment individual to each group, the plurality of signal wires 103 used for conveying metering information from the common marker being associated with the relevant metering equipment for each group. It has further been assumed that the single track referred to has separate writing and reading heads situated diametrically opposite each other. Continuing, then, on the assumptions just stated, the single track referred to is designated MSD in the figure, which shows the track broken and in development and also shows the associated writing head WH and reading head RH. The common multi-metering equipment includes a first control circuit WCC and a second control circuit RCC. The control circuit WCC serves for controlling the writing head WH. The control circuit RCC is controlled by the reading head RH, and serves both for controlling the application of metering pulses to supervisory link circuits in accordance with the information read by this reading head and for controlling the writing head WH by way of the control circuit WCC. As will be seen from the figure, the plurality of signal wires 103 used for conveying metering information from the common marker are connected to the control circuit WCC. These wires are eight in number. The supervisory link circuits are associated with the magnetic storage drum by means of a time-division-multiplex system synchronised with the drum. Each supervisory link circuit has individual to if two storage compartments on the track MSD, these two storage compartments being such that as either is passing under the writing head WH the other is passing under the reading head RH. Each storage compartment comprises eight element storage spaces arranged serially around the track, and is thus capable of recording two words each of four binary digits. Each channel time period of the time-division-multiplex system is divided into eight equal element time periods $t_{1a}$, $t_{2a}$, $t_{3a}$, $t_{4a}$, $t_{1b}$, $t_{2b}$, $t_{3b}$, and $t_{4b}$. Binary digits comprising metering information relating to a call are recorded on the drum during the eight element time periods $t_{1a}$ to $t_{4b}$ of a relevant channel time period. In view of the correspondence between element storage spaces and element time periods, the same designations $t_{1a}$ to $t_{4b}$ will herein be used to denote both element storage spaces and the corresponding element time periods. The time-division-multiplex system by means of which the supervisory link circuits are associated with the magnetic storage drum comprises a backward mark multiplex TDM1, a forward hold multiplex TDM2, a metering multiplex TDM3, and a backward hold multiplex TDM4. Each of the three multiplexes TDM1, TDM2, and TDM4 has an input wire per channel, i.e. per supervisory link circuit, and has an output pulse highway and serves to produce on this highway, during periods in which there is a stimulus on an input wire, the pulse train pertaining to the channel to which this input wire corresponds. The metering multiplex TDM3 has an output wire per channel, i.e. per supervisory link circuit, and has an input pulse highway and serves to produce, during periods in which the pulses of a pulse train pertaining to a channel are applied to this highway, a stimulus on the output wire corresponding to this channel. The input wires 21, 16, and 50, corresponding to a supervisory link circuit, of the multiplexes TDM1, TDM2, and TDM4 respectively, are connected to the respective wires 104, 105, and 106 of the link circuit. The output wire, corresponding to a supervisory link circuit, of the metering multiplex TDM3 is constituted by the metering wire 107 of the link circuit.

Still referring to FIG. 2, the general operation of the multi-metering arrangements is as follows.

As long as a supervisory link circuit is at normal, the writing in each of the element storage spaces pertaining to it is "0." For a brief time after the link circuit is appropriated for a call, a backward marking condition extended backwards from the common marker exists on the backward marking wire 104 of the link circuit, a forward hold condition extended forwards from the relevant first selecting switch exists on the forward holding wire 105 of the link circuit, and, where the call is one from a local subscriber and is not a free call, a stimulus applied by the common marker exists on one or more of the eight signal wires 103. The backward marking condition on the backward marking wire 104 of the link circuit, extended to the wire 21, constitutes a stimulus on the wire 21 causing pulses pertaining to the link circuit to appear on the output pulse highway 22 of the multiplex TDM1, and the forward hold condition on the forward holding wire 105, extended to the wire 16, constitutes a stimulus causing pulses pertaining to the link circuit to appear on the output pulse highway 13 of the multiplex TDM2. Thus, since it is arranged that the brief time previously referred to is sufficient to ensure that it is so, for the duration of at least one channel time period pertaining to the link circuit the condition obtains that a pulse exists on the pulse highway 22 and a pulse exists on the pulse highway 13. This causes gating circuits included in the control circuit WCC to be opened for the duration of a channel time period pertaining to the link circuit, and thereby causes the writing in the element storage space $t_{1a}$ of a storage compartment pertaining to the link circuit to be changed from "0" to "1" if a stimulus exists on the first of the eight signal wires 103 during this channel time period, the writing in the element storage space $t_{2a}$ of this storage compartment to be changed from "0" to "1" if a stimulus exists on the second of these signal wires during this channel time period, the writing in the element storage space $t_{3a}$ of this storage compartment to be changed from "0" to "1" if a stimulus exists on the third of these signal wires during this channel time period, and so on. The significances, as regards metering action, of various four-digit binary numbers thus written in the element storage spaces $t_{1a}$, $t_{2a}$, $t_{3a}$, and $t_{4a}$ of a storage compartment pertaining to the link circuit are as given in the following Table A. The significances, as regards metering action, of various four-digit binary numbers thus written in the element storage spaces $t_{1b}$, $t_{2b}$, $t_{3b}$, and $t_{4b}$ of a storage compartment pertaining to the link circuit are as given in the following Table B.

*Table A*

| Writings in element storage spaces | | | | Significance as regards metering action |
|---|---|---|---|---|
| $t_{1a}$ | $t_{2a}$ | $t_{3a}$ | $t_{4a}$ | |
| 0 | 0 | 0 | 0 | No metering. (Free call, call not originating locally.) |
| 0 | 0 | 0 | 1 | 1 operation. (Sole operation on untimed call, initial operation on timed call.) |
| 1 | 0 | 0 | 1 | 2 operations. (Untimed call.) |
| 0 | 1 | 0 | 1 | 3 operations. (Untimed call.) |
| 1 | 1 | 0 | 1 | 4 operations. (Untimed call.) |
| 0 | 0 | 1 | 1 | 5 operations. (Untimed call.) |
| 1 | 0 | 1 | 1 | 6 operations. (Untimed call.) |
| 0 | 1 | 1 | 1 | 7 operations. (Untimed call.) |
| 1 | 1 | 1 | 1 | 8 operations. (Untimed call.) |

*Table B*

| Writings in element storage spaces | | | | Significance as regards metering action |
|---|---|---|---|---|
| $t_{1b}$ | $t_{2b}$ | $t_{3b}$ | $t_{4b}$ | |
| 0 | 0 | 0 | 0 | No metering on timed basis. (Free call, untimed call, call not originating locally.) |
| 1 | 0 | 0 | 0 | 1 operation/minute. (Timed call.) |
| 0 | 1 | 0 | 0 | 2 operations/minute. (Timed call.) |
| 1 | 1 | 0 | 0 | 3 operations/minute. (Timed call.) |
| 0 | 0 | 1 | 0 | 4 operations/minute. (Timed call.) |
| 1 | 0 | 1 | 0 | 5 operations/minute. (Timed call.) |
| 0 | 1 | 1 | 0 | 6 operations/minute. (Timed call.) |
| 1 | 1 | 1 | 0 | 7 operations/minute. (Timed call.) |
| 0 | 0 | 0 | 1 | 8 operations/minute. (Timed call.) |
| 1 | 0 | 0 | 1 | 9 operations/minute. (Timed call.) |
| 0 | 1 | 0 | 1 | 10 operations/minute. (Timed call.) |
| 1 | 1 | 0 | 1 | 11 operations/minute. (Timed call.) |
| 0 | 0 | 1 | 1 | 12 operations/minute. (Timed call.) |
| 1 | 0 | 1 | 1 | 13 operations/minute. (Timed call.) |
| 0 | 1 | 1 | 1 | 14 operations/minute. (Timed call.) |
| 1 | 1 | 1 | 1 | 15 operations/minute. (Timed call.) |

Consideration of Table A will show that, where the call is one in respect of which metering is to be effected, the four-digit binary number written in the element storage spaces $t_{1a}$, $t_{2a}$, $t_{3a}$, and $t_{4a}$ of a relevant storage compartment is in each case (taking the writing in the element storage space $t_{1a}$ to be the units digit, the writing in the element storage space $t_{2a}$ to be the twos digit, and so on), the number obtained by converting to the binary code and the number (given on the right of Table A) representing the number of meter operations concerned, subtracting one from the three-digit binary number thus obtained, and adding a fourth (eights) digit "1." Consideration of Table B will show that, where the call is one in respect of which metering on a timed basis is to be effected, the four-digit binary number written in the element storage spaces $t_{1b}$, $t_{2b}$, $t_{3b}$, and $t_{4b}$ of a relevant storage compartment is in each case (taking the writing in the element storage space $t_{1b}$ to be the units digit, the writing in the element storage space $t_{2b}$ to be the twos digit, and so on) the number obtained by converting to the binary code the number (given on the right of Table B) representing the required number of meter operations per minute. It suffices for the four-digit binary number in accordance with Table B to be written in the element storage spaces $t_{1b}$, $t_{2b}$, $t_{3b}$, and $t_{4b}$ of only one of the two storage compartments pertaining to the link circuit, but the multi-metering arrangements function quite properly if the number happens to be written in both these compartments. The control exerted on the control circuit WCC by the control circuit RCC is such that the four-digit binary number in accordance with Table A, when written in the element storage spaces $t_{1a}$, $t_{2a}$, $t_{3a}$, and $t_{4a}$ of one of the two storage compartments pertaining to the link circuit, is automatically written in the other of these two storage compartments when the first-mentioned compartment next passes under the reading head RH.

When the call is answered, a backward hold condition appears on the backward holding wire 106 of the supervisory link circuit. This backward hold condition, extended to the wire 50, constitutes a stimulus on the wire 50 causing pulses pertaining to the link circuit to appear on the output pulse highway 51 of the backward hold multiplex TDM4. This brings about, where the call is one in respect to which metering is to be effected, the production of a pulse on the input pulse highway 108 of the metering multiplex TDM3 during one or more channel time periods pertaining to the link circuit, the pulse or pulses so produced causing a stimulus to appear on the metering wire 107 of the link circuit a number of times which depends on the writings in the element storage spaces $t_{1a}$, $t_{2a}$, $t_{3a}$, $t_{4a}$ $t_{1b}$, $t_{2b}$, $t_{3b}$, and $t_{4b}$ pertaining to the link circuit and, if the call is one to be metered on a timed basis, on the duration of the call. Each appearance of a stimulus on the metering wire 107 of the link circuit brings about the operation of the calling subscriber's meter.

For metering on an untimed basis, the multi-metering arrangements are supplied with regularly recurring metering pulses $P_0$ (see the pulse waveform diagram of FIG. 3) each of which lasts exactly half one complete revolution of the magnetic storage drum, and each of which commences at a time in which the element storage spaces $t_{4b}$ of one pair of associated storage compartments have just moved out of effective association with the reading and writing heads WH and RH and the element storage spaces $t_{1a}$ of another pair of associated storage compartments are about to move into effective association with these heads. The recurrence frequency of the pulses is 32/15, i.e. roughly 2, per second. The particular value 32/15 is chosen for reasons concerned with the relationship of the various different trains of regularly recurring metering pulses used in the multi-metering arrangements. Each time the condition occurs that a pulse pertaining to the supervisory link circuit exists on the output pulse highway 51 of the backward hold multiplex TDM4 and a pulse $P_0$ exists, the four-digit binary number recorded in the element storage spaces $t_{1a}$, $t_{2a}$, $t_{3a}$, and $t_{4a}$ pertaining to the link circuit is changed to a value obtained by subtracting one from the previously existing value, it being however arranged that such action, no matter how often it is repeated, cannot change the writings in the element storage spaces $t_{4a}$ from "0" to "1." It will be seen from Table A that the writings in the element storage spaces $t_{4a}$ before the call is answered are only "0" in the case where no metering action is required. In other cases, until the writings in the element storage spaces $t_{4a}$ pertaining to the link circuit have been changed to "0" as a result of the subtracting action just referred to, a pulse pertaining to the link circuit is produced on the input pulse highway 108 of the metering multiplex TDM3 each time the condition occurs that a pulse pertaining to the link circuit exists on the output pulse highway 51 of the backward hold multiplex TDM4 and a pulse $P_0$ exists. Thus, since the Pulses $P_0$ recur at a frequency of roughly 2 per second, within a brief time after the call is answered the meter of the calling subscriber is operated once in the case of a call to be metered on a timed basis, and one or more times as appropriate in the case of a call to be metered on an untimed basis. For example, in the case where the requisite number of meter operations in respect of a call to be metered on an untimed basis is 4, the four-digit binary number recorded in the element storage spaces $t_{1a}$, $t_{2a}$, $t_{3a}$, and $t_{4a}$ pertaining to the link circuit before the call is answered is 1011 (writing the units digit on the right). In this particular case, the first subtraction (accompanied by one operation of the calling subscriber's meter) changes the number concerned to 1010, the second subtraction (accompanied by another operation of the meter) changes it to 1001, the third subtraction (accompanied by yet another operation of the meter) changes it to 1000, and the fourth subtraction (accompanied by a still further operation of the meter) changes it to 0111, after which the eights digit (recorded in the relevant element storage spaces $t_{4a}$) remains "0" as previously mentioned and no further operation of the meter takes place in respect of the call.

For metering on a timed basis, the multi-metering arrangements are supplied with regularly recurring metering pulses $P_1$ (see the pulse waveform diagram of FIG. 3) of a recurrence frequency of 1 per minute, regularly recurring metering pulses $P_2$ of a recurrence frequency of 2 per minute, regularly recurring metering pulses $P_4$ of a recurrence frequency of 4 per minute, and regularly recurring metering pulses $P_8$ of a recurrence frequency of 8 per minute. Each pulse $P_1$, $P_2$, $P_4$, and $P_8$ lasts for just over one complete revolution of the magnetic storage drum. It is arranged that each pulse $P_4$ occurs in the middle of the interval between two consecutive pulses $P_8$, that each pulse $P_2$ occurs in the middle of the interval between the two consecutive pulses $P_4$, and that each pulse $P_1$ occurs in the middle of the interval between two consecutive pulses $P_2$. It follows from this that as is clearly shown in FIG. 3, each metering pulse supplied for the purposes of metering on a timed basis (irrespective of whether it is a $P_1$, $P_2$, $P_4$, or $P_8$ pulse) is spaced in time from all other such pulses. Each time it happens, with "0" written in the element storage spaces $t_{4a}$ pertaining to the link circuit, that the reading head RH reads "1" in an element storage space $t_{1b}$ pertaining to the supervisory link circuit and a pulse $P_1$ exists, or reads "1" in an element storage space $t_{2b}$ pertaining to the link circuit and a pulse $P_2$ exists, or reads "1" in an element storage space $t_{3b}$ pertaining to the link circuit and a pulse $P_4$ exists, or reads "1" in an element storage space $t_{4b}$ pertaining to the link circuit and a pulse $P_8$ exists, a pulse is produced on the input pulse highway 108 of the metering multiplex TDM3 during the channel time period concerned. Where (as occurs for example when the four-digit binary number in accordance with Table B happens to be written in the element storage spaces $t_{1b}$, $t_{2b}$, $t_{3b}$, and $t_{4b}$ of both the storage compartments pertaining to the link circuit) two or three pulses are produced on the pulse highway 108 in respect to a metering pulse $P_1$, $P_2$, $P_4$, or $P_8$ which affects this highway, the two or three pulses are so close together that they only produce a single metering stimulus on the metering wire 107 of the link circuit. If, for example, metering on a timed basis is to be effected at the rate of 11 meter operations per minute, then the four-digit binary number recorded in the element storage spaces $t_{1b}$ to $t_{4b}$ is (see Table B) 1011 (writing the units digit on the right). In this particular case, neglecting any deviation from strictly correct metering liable to arise owing to the fact that metering on a timed basis is not necessarily initiated at the beginning of a cycle of the metering pulses $P_1$, $P_2$, $P_4$, and $P_8$ (which for this purpose is taken to begin in the middle of the interval between two consecutive pulses $P_1$), in the first minute of metering on a timed basis the condition that the reading head RH reads "1" in an element storage space $t_{1b}$ pertaining to the link circuit at least once during the existence of a pulse $P_1$ arises once, the condition that the reading head RH reads "1" in an element storage space $t_{2b}$ pertaining to the link circuit at least once during the existence of a pulse $P_2$ arises twice, the condition that the reading head RH reads "1" in an element storage space $t_{3b}$ pertaining to the link circuit at least once during the existence of a pulse $P_4$ does not arise, and the condition that the reading head RH reads "1" in an element storage space $t_{4b}$ pertaining to the link circuit at least once during the existence of a pulse $P_8$ arises eight times. Thus the number of times the calling subscriber's meter is operated during this first minute of metering on a timed basis is $1+2+0+8=11$ as is requisite. Metering proceeds correspondingly in subsequent minutes for which the link circuit remains held by the calling subscriber.

Referring now to FIGS. 4A and 4B, these when placed side by side with FIG. 4B to the right of FIG. 4A together constitute a schematic diagram, of the so-called functional type, showing the constitution and organisation of the multi-metering arrangements. FIG. 4A shows the constitution and organisation of the control circuit WCC of FIG. 2 and also shows typical elements of the multiplexes TDM1 and TDM2 of FIG. 2. FIG. 4B shows the constitution and organisation of the control circuit RCC of FIG. 2 and also shows typical elements of the multiplexes TDM3 and TDM4 of FIG. 2. The wires FL1, FL2, FL3, FL4, FL5, FL6, FL7, and FL8 are the signal wires (represented at 103 in FIG. 2) used for conveying metering information from the common marker. As well as being supplied with the metering pulses $P_0$, $P_1$, $P_2$, $P_4$, and $P_8$, the multi-metering arrangements are supplied with various trains of regularly recurring control pulses (see the pulse waveform diagrams of FIGS. 5 and 6). Those wires in FIGS. 4A and 4B to which regularly recurring metering or control pulses are directly applied are shown designated with the same designations as are given to the pulses concerned. All the pulses of the pulse waveform diagrams of FIGS. 5 and 6 are positive pulses. Regularly recurring control pulses $t_1$ and $t_2$ are shown in both FIGS. 5 and 6, and a comparison of the representations of such pulses in FIG. 6 with the representations of such pulses in FIG. 5 will show how the horizontal (time) scales in these two figures differ. For each set of eight storage compartments comprising four consecutive storage compartments and the associated diametrically opposite four consecutive storage compartments, there is a train of primary channel-selecting control pulses of which only one pulse of a train of pulses W is shown in FIG. 5. The pulses of the other trains of primary channel-selecting control pulses are similar to the pulse W shown in FIG. 5 but are so staggered in time with reference to the pulses W that, as will be readily understood by those skilled in the art, the pulses of any train of primary channel-selecting control pulses are not overlapped by the pulses of any other such train. Each pulse of a train of primary channel-selecting control pulses exists for the duration of four consecutive channel time periods of the time-division-multiplex system, these being channel time periods pertaining to the eight storage compartments to which the train pertains. In each channel time period of the time-division-multiplex system, there exists a primary channel-selecting control pulse of the appropriate train of such pulses. The regularly recurring control pulses supplied to the multi-metering arrangements include four trains of secondary channel-selecting control pulses $S_1$, $S_2$, $S_3$, and $S_4$. Each pulse of a train of secondary channel-selecting control pulses exists for the duration of a channel time period of the time-division-multiplex system, and in each channel time period of this system there exists a secondary channel-selecting control pulse of the appropriate train. It will be clear from FIG. 5 and the explanation just given, that for each channel of the time-division-multiplex system there is a unique combination of trains of channel-selecting control pulses, this combination comprising one of the trains of primary channel-selecting control pulses and one of the four trains of secondary channel-selecting control pulses. The particular typical elements of the multiplexes TDM1, TDM2, TDM3, and TDM4 which are included in FIGS. 4A and 4B are shown as pertaining to the channel for which the unique combination just referred to is the one comprising the train of pulses W and the train of pulses $S_1$. The particular typical element of the backward mark multiplex TDM1 which is included in FIG. 4A comprises a gating circuit G11 connected between the relevant input wire 21 of the multiplex and the output pulse highway 22. The particular typical element of the forward hold multiplex TDM2 which is included in FIG. 4A comprises a gating circuit G16 connected between the relevant input wire 16 of the multiplex and the output pulse highway 13. The particular typical element of the metering multiplex TDM3 which is included in FIG. 4B comprises a gating circuit G43, a pulse lengthener L1, and a gating circuit G44. One input circuit of the gating circuit G43 is connected to the input pulse highway 108 of the multiplex, and the output circuit of this gating circuit is linked to a group pulse highway 110 by the pulse lengthener L1. The group pulse highway 110, which is common to one quarter of the channels of the time-division-multiplex system, is linked to the relevant output wire 107 of the multiplex by the gating circuit G44. The pulse lengthener L1 serves to produce a pulse of about 50 microseconds duration on the group pulse highway 110 in response to each pulse transmitted through the gating circuit G43, 50 microseconds being shorter than the duration of a primary channel-selecting control pulse. The particular typical element of the backward hold multiplex TDM4 which is included in FIG. 4B comprises a gating circuit G35 connected between the relevant input wire 50 of the multiplex and the output pulse highway 51. The regularly recurring control pulses supplied to the multi-metering arrangements further include two trains of primary element-selecting control pulses $t_a$ and $t_b$, and four trains of secondary element-selecting control pulses $t_1$, $t_2$, $t_3$, and $t_4$. Each primary element-selecting control pulse $t_a$ exists for the duration of the element time periods $t_{1a}$, $t_{2a}$, $t_{3a}$, and $t_{4a}$ of a channel time period, and each primary element-selecting control pulse $t_b$ exists for the duration of the element time periods $t_{1b}$, $t_{2b}$, $t_{3b}$, and $t_{4b}$ of a channel time period, there being one pulse $t_a$ and one pulse $t_b$ for each channel time period. Each secondary element-selecting control pulse $t_1$, $t_2$, $t_3$, or $t_4$ exists for the duration of an element time period, and in each element time period there exists a secondary channel-selecting control pulse of the appropriate train. It will be clear, from FIG. 5 and the explanation just given, that, so far as any one channel time period of the time-division-multiplex system is concerned, for each element time period within this channel time period there is a unique combination of element-selecting control pulses, the element time period $t_{1a}$ being in effect denoted by the coincidence of a pulse $t_1$ and a pulse $t_a$, the element time period $t_{2a}$ being in effect denoted by the coincidence of a pulse $t_2$ and a pulse $t_a$; and so on. In each element time period there occur in order, but with intervals between them and after the last of them, a driving control pulse $K_D$ (see FIG. 6), a reading control pulse $K_R$, a writing control pulse $K_W$, and a gating control pulse $K_P$. All the control pulses are derived from timing tracks on the magnetic storage drum, and form an essential operating means of the time-division-multiplex system, which by its dependence upon them is synchronised with the drum.

In addition to the constituent elements already mentioned, the arrangements shown in FIG. 4A include ten gating circuits G1 to G10 concerned with receiving metering information from the common marker, a main write "0" gating circuit G15, auxiliary write "0" gating circuits G13, G18, and G20, a main write "1" gating circuit G14, auxiliary write "1" gating circuits G12, G17 and G19, a write "0" amplifier A2 associated with the writing head WH, and a write "1" amplifier A1 associated with this writing head. The wires 104 and 105 in FIG. 4A correspond to the wires in FIG. 2 which bear the same designations, being respectively the backward marking and forward holding wires of the supervisory link circuit concerned. It will be remembered that it has been assumed that the number of supervisory link circuits is such as to permit the requisite storage compartments pertaining to them to be provided by the single track MSD on the magnetic storage drum. It may be helpful to point out here that where this is not so, and the supervisory link circuits are accordingly divided into groups each having an individual track such as MSD and individual metering equipment, the gates G1 to G10 may be common to all the groups. The gating circuit G20 and the amplifier A2 operate to the end that the presence of a stimulus on a write "0" wire 11 when a writing control pulse $K_W$ occurs causes "0" to be written in the element storage space then passing under the writing head WH. The gating circuit G19 and the amplifier A1 operate to the end that the presence of a stimulus on a write "1" wire 20 when a writing control pulse $K_W$ occurs causes "1" to be written in the element storage space then passing under the writing head WH.

In addition to the constituent elements already mentioned, the arrangements shown in FIG. 4B include a subtraction and untimed metering circuit comprising twelve gating circuits G23 to G34 and a trigger circuit T1, a timed metering circuit comprising seven gating circuits G36 to G42 and a trigger circuit T4, a read "0" gating circuit G22, a read "1" gating circuit G21, a read "0" trigger circuit T2, a read "1" trigger circuit T3, a read "0" amplifier A3 associated with the reading head RH, and a read "1" amplifier associated with this reading head. The wires 106 and 107 in FIG. 4B correspond to the wires in FIG. 2 which bear the same designations, being respectively the backward holding and metering wires of the supervisory link circuit concerned. Merely as an aid to memory when following the operation of the arrangements of FIG. 4B the metering wire 107 is shown connected directly to a meter M1. The gating circuit G22 and the amplifier A3 operate to the end that the passage under the reading head RH of an element storage space in which "0" is recorded causes a stimulus to appear on a read "0" wire 45 during the relevant reading control pulse $K_R$. The gating circuit G21 and the amplifier A4 operate to the end that the passage under the reading head RH of an element storage space in which "1" is recorded causes a stimulus to appear on a read "1" wire 33 during the relevant reading control pulse $K_R$.

Still referring to FIGS. 4A and 4B, as long as none of the signal wires FL1 to FL8 has a stimulus applied to it by the common marker, and none of the backward marking wires such as 104 has a stimulus (backward marking condition) applied to it, and none of the forward holding wires such as 105 has a stimulus (forward hold condition) applied to it, the gating circuits G1 to G13, G16, G17 and G19 are all in the closed condition, and the gating circuit G18 produces a stimulus on the write "0" wire 11 in response to the absence of a stimulus on wire 13, causing "0" to be written in all the element storage spaces on the track MSD.

It will now be assumed by way of example that the supervisory link circuit to which the wires 104, 105, 106, and 107 pertain is appropriated for a call, the call being one such that metering is to be effected in respect of it on an untimed basis, the number of meter operations required being 6. In this case, when, for a brief time after the link circuit is appropriated, a backward marking condition extended backwards from the common marker exists on the backward marking wire 104 and a forward hold condition extended forwards from the relevant first selecting switch exists on the forward holding wire 105, a stimulus applied by the common marker exists on each of the signal wires FL1, FL3, FL4, and no stimulus exists on any of the signal wires FL2, FL5, FL6, FL7, and FL8. Consequently, in at least one channel time period pertaining to the link circuit, the gating circuit G11 produces a stimulus on wire 22 during all the eight element time periods, the gating circuit G16 produces a stimulus on wire 13 during all the eight element time periods, the gating circuit G1 produces a stimulus on the wire 24 during the element time periods $t_{1a}$ and $t_{1b}$, the gating circuit G3 produces a stimulus on the wire 24 during the element time periods $t_{3a}$ and $t_{3b}$, and the gating circuit G4 produces a stimulus on the wire 24 during the element time periods $t_{4a}$ and $t_{4b}$. The gating circuit G9 renders the stimuli produced on the wire 24 during the element time periods $t_{1b}$, $t_{3b}$, and $t_{4b}$ ineffective, but in response to the stimuli produced on this wire during the element time periods $t_{1a}$, $t_{3a}$, and $t_{4a}$ this gating circuit produces corresponding stimuli on the wire 25 and hence on the wire 26. It follows that, during each of the element time periods $t_{1a}$, $t_{3a}$, and $t_{4a}$ of at least one channel time period pertaining to the link circuit, the appearance of stimuli on both the wires 22 and 26 causes the gating circuit G12 to produce a stimulus on the wire 27, the appearance of a stimulus on the wire 27 causes the gating circuit G14 to produce a stimulus on the wire 19 and inhibits the gating circuit G15, and the appearance of stimuli on both the wires 13 and 19 causes the gating circuit G17 to produce a stimulus on the write "1" wire 20, with the result that "1" is written in the element storage space then passing under the writing head WH. Thus the metering action required in respect of the call (i.e. metering on an untimed basis with 6 operations of the meter) is recorded on the magnetic storage drum by the writing, in at least one of the two storage compartments pertaining to the link circuit, of "1" in place of "0" in each of the three element storage spaces $t_{1a}$, $t_{3a}$, and $t_{4a}$ (see Tables A and B). The normal condition of the trigger circuit T1 is one in which it produces a stimulus on the wire 42, and the arrangements for the control of this trigger circuit are such that it is only set to its operated condition in a channel time period if the backward hold condition appears on the relevant backward holding wire 106. In the case of the call now being considered by way of example, after the common marker has been released and until the call is answered all that happens, so far as any material effect is concerned, when the reading head RH reads "1" in an element storage space $t_{1a}$, $t_{3a}$, or $t_{4a}$ pertaining to the link circuit, is that the appearance of a stimulus on the read "1" wire 33 during the relevant reading control pulse $K_R$ sets the trigger circuit T3 to its operated condition in which it produces a stimulus on wire 34, the appearance of a stimulus on wire 34 causes the gating circuit G29 to produce a stimulus on wire 35, the presence of stimuli on both the wires 35 and 42 causes the gating circuit G28 to produce a stimulus on wire 9, and the presence of a stimulus on wire 9 causes the main write "1" gating circuit G14 to produce a stimulus on wire 19, thereby causing "1" to be written or rewritten in the element storage space $t_{1a}$, $t_{3a}$, or $t_{4a}$ then passing under the writing head WH. Further, after the common marker has been released and until the call is answered all that happens, so far as any material effect is concerned, when the reading head RH reads "0" in an element storage space $t_{2a}$ pertaining to the link circuit, is that the appearance of a stimulus on the read "0" wire 45 during the relevant reading control pulse $K_R$ sets the trigger circuit T2 to its operated condition in which it produces a stimulus on wire 46, the appearance of a stimulus on wire 46 causes the gating circuit G24 to produce a stimulus on wire 47, the presence of stimuli on both the wires 42 and 47 causes the gating circuit G25 to produce a stimulus on wire 10, and the presence of a stimulus on wire 10 causes the main write "0" gating circuit G15 to produce a stimulus on wire 23, thereby causing "0" to be written or re-written in the element storage space $t_{2a}$ then passing under the writing head WH. When set during an element time period, the trigger circuit T2 or T3 is reset to normal at the beginning of the next succeeding element time period by the relevant driving control pulse $K_D$.

When the call now being considered by way of example is answered, and the backward hold condition consequently appears on the backward holding wire 106 of the supervisory link circuit concerned, the gating circuit G35 produces a stimulus on wire 51 during each channel time period pertaining to this link circuit. In each such channel time period in which no metering pulse $P_0$ exists, the stimulus on wire 51 is without effect and all that happens, so far as any material effect is concerned, when the reading head RH erads "1" in an element storage space $t_{1a}$, $t_{3a}$, or $t_{4a}$ or reads "C" in an element storage space $t_{2a}$ is that what is read is re-written without change in the manner just described. In each channel time period pertaining to the link circuit in which a metering pulse $P_0$ exists (it will be remembered that each such pulse lasts exactly half one complete revolution of the magnetic storage drum), the appearance of a stimulus on wire 51 causes the gating circuit G34 to produce a stimulus on wire 52, this stimulus lasting for the whole of the channel time period. The appearance of a stimulus on wire 52 causes the gating circuit G32 to produce a stimulus on wire 56 for the duration of the driving control pulse $K_D$ occurring in the relevant element time period $t_{1a}$, with the result that upon the occurrence of this driving control pulse the trigger circuit T1 is set to its operated condition in which it produces a stimulus on wire 40 and not on wire 42. In the first channel time period in which this happens in respect of the call now being considered, when the reading head RH reads "1" in the relevant element storage space $t_{1a}$ the trigger circuit T3 is set and a stimulus is produced on wire 35 by the gating circuit G29 as previously described, but the appearance of a stimulus on wire 35 with a stimulus present on wire 40 and no stimulus present on wire 42 leaves wire 9 unaffected and causes the gating circuit G27 to produce a stimulus on wire 57 and therefore on wire 10, with the result that "0" is written in place of "1" in the element storage space $t_{1a}$ then passing under the writing head WH. Upon the occurrence of the relevant gating control pulse $K_P$ during the element time period $t_{1a}$ concerned the gating circuit G31 produces a stimulus on wire 41 and thereby resets the trigger circuit T1 to its normal condition. If the pulse $t_1$ in FIG. 6 is assumed to be the pulse $t_1$ of the element time period $t_{1a}$ concerned, then X in this figure indicates the portion of this element time period for which the trigger circuit T3 is operated, Y indicates the portion of this element time period for which the trigger circuit T1 is operated, and Z indicates the portion of this element time period for which the gating circuit G27 produces a stimulus on wires 57 and 10. It will be noted that the relevant writing control pulse $K_W$ occurs within the time period Z. Still referring to the same channel time period, when the reading head RH reads "0" in the relevant element storage space $t_{2a}$, and reads "1" in the relevant element storage space $t_{3a}$, what is read is re-written without change in the manner previously described. When, however, the reading head RH reads "1" in the relevant element storage space $t_{4a}$, the consequent appearance of a stimulus on wire 35 with a stimulus present on wire 52 causes the gating circuit G33 to produce a stimulus on wire 54. This stimulus on wire 54, extended to the input pulse highway 108 of the metering multiplex, causes the relevant elements (G43, L1, and G44) of this multiplex to produce a stimulus on the metering wire 107 of the link circuit, so that one of the required 6 operations of the calling subscriber's meter is effected. Thus, in the first channel time period pertaining to the link circuit in which, in respect of the call now being considered, the trigger circuit T1 is set to its operated condition, the calling subscriber's meter is operated once and the four-digit binary number recorded in the element storage spaces $t_{1a}$, $t_{2a}$, $t_{3a}$, and $t_{4a}$ of one storage compartment pertaining to the link circuit is changed to 1100 (writing the units digit on the right), i.e. is changed to the value obtained by subtracting one from the previously existing value 1101. During the next half revolution of the magnetic storage drum, the four-digit binary number recorded in the element storage spaces $t_{1a}$ to $t_{4a}$ of the other storage compartment pertaining to the link circuit is also changed to 1100, this change being effected when the reading head RH reads "0" in the element storage space $t_{1a}$ in the relevant channel time period. When the next metering pulse $P_0$ occurs, the trigger circuit T1 is again set to its operated condition at the beginning of a channel time period pertaining to the link circuit. When, during this channel time period, the reading head RH reads "0" in the relevant element storage space $t_{1a}$ the trigger circuit T2 is set and a stimulus is produced on wire 47 by the gating circut G24 as previously described, but the appearance of a stimulus on wire 47 with a stimulus present on wire 40 (since T1 is in its operated condition) and no stimulus present on wire 42 leaves wire 10 unaffected and causes the gating circuit G26 to produce a stimulus on wire 58 and therefore on wire 9, with the result that "1" is written in place of "0" in the element storage space $t_{1a}$ then passing under the writing head WH. Since the gating circuit G31 only produces a stimulus on wire 41, to reset the trigger circuit T1, when the reading head RH reads "1" in an element storage space $t_{1a}$ to $t_{4a}$, in the case of the channel time period now being considered this trigger circuit is not reset until the occurrence of the relevant gating control pulse $K_P$ during the element time period $t_{3a}$. Hence, in the channel time period now being considered, when the reading head RH reads "0" in the relevant element storage space $t_{2a}$, the resulting appearance of a stimulus on wire 47 leaves wire 10 unaffected and causes "1" to be written instead of "0" in the element storage space $t_{2a}$ then passing under the writing head WH, and when the reading head RH reads "1" in the relevant element storage space $t_{3a}$, the resulting appearance of a stimulus on wire 35 leaves wire 9 unaffected and causes "0" to be written instead of "1" in the element storage space $t_{3a}$ then passing under the writing head WH. As before, a stimulus is produced on wire 54 when the reading head RH reads "1" in the relevant element storage space $t_{4a}$. Thus, in the second channel time period pertaining to the link circuit in which, in respect of the call now being considered, the trigger-circuit T1 is set to its operated condition, the calling subscriber's meter is again operated once and the four-digit binary number recorded in the element storage spaces $t_{1a}$ to $t_{4a}$ of one storage compartment pertaining to the link circuit is further reduced by one, i.e. is changed to 1011 (writing the units digit on the right). In the same general manner, subtraction accompanied by one operation of the meter proceeds until the four-digit binary number just mentioned is reduced to 0111. It will be clear that, in the case being considered by way of example, the reduction of the four-digit binary number 1101 originally recorded to 0111 involves six subtractions of one and six operations of the calling subscriber's meter, as is requisite in this case. Once the writings in the element storage spaces $t_{4a}$ pertaining to the supervisory link circuit have been changed from "1" to "0" they remain at "0"

as long as the link circuit is held on the call, since the gating circuit G26 cannot produce a stimulus on wire 58 in an element time period $t_4$, the control exerted on the gating circuit G26 by a gating circuit G23 being arranged to operate to this end. It follows that further subtracting operations in respect of the call are ineffective in that they cannot bring about operation of the calling subscriber's meter. The function of the gating circuit G30 is to reset the trigger circuit T1 to its normal condition whenever it happens to be in its operated condition at a time when the reading head RH reads "0" in an element storage space $t_{4a}$.

Still referring to FIGS. 4A and 4B, it will now be assumed, as a further example, that the supervisory link circuit to which the wires 104, 105, 106, and 107 pertain is appropriated for a call in respect of which metering is to be effected on a timed basis at the rate of 12 meter operations per minute. In this case, when, for a brief time after the link circuit is appropriated, a backward marking condition exists on the backward marking wire 104 and a forward hold condition exists on the forward holding wire 105, a stimulus applied by the common marker exists on each of the signal wires FL4, FL7, and FL8, and no stimulus exists on any of the signal wires FL1, FL2, FL3, FL5, and FL6. Consequently as will be clear from the descriptions already given, the metering action required in respect of the call (i.e. on initial operation of the meter followed by metering on a time basis at the rate of 12 meter operations per minute) is recorded on the magnetic storage drum by the writing, in each of the two storage compartments pertaining to the link circuit, of "1" in place of "0" in the element storage space $t_{4a}$ and by the writing, in at least one of these two storage compartments, of "1" in place of "0" in each of the two element storage spaces $t_{3b}$ and $t_{4b}$ (see Tables A and B), The initial operation of the calling subscriber's meter is brought about by the same operations as would occur in the case of an untimed call in respect of which only one operation of the meter is required. Thus, in the first channel time period pertaining to the link circuit in which, in respect of the timed call now being considered, the trigger circuit T1 is set to its operated condition, the calling subscriber's meter is operated once when the reading head RH reads "1" in the relevant element storage space $t_{4a}$, and the four-digit binary number recorded in the element storage spaces $t_{1a}$ to $t_{4a}$ of one storage compartment pertaining to the link circuit is changed from 1000 (writing the units digit on the right) to 0111. During the next half revolution of the magnetic storage drum, the four-digit binary number recorded in the element storage spaces $t_{1a}$ to $t_{4a}$ of the other storage compartment pertaining to the link circuit is also changed to 0111. Thereafter, as long as the link circuit is held on the call (i.e. as long as the forward hold condition in respect of the call is maintained on the forward holding wire 105), in each channel time period pertaining to the link circuit the appearance of a stimulus on wire 47, and therefore on wire 66, during the element time period $t_{4a}$ causes the gating circuit G41 to produce a stimulus on wire 60, with the result that the trigger circuit T4 is set to its operated condition in which it produces a stimulus on wire 62. When thus set, the trigger circuit T4 remains in its operated condition until it is reset to its normal condition by the stimulus which the gating circuit G42 produces on wire 61 during the element time period $t_{1a}$ of the next succeeding channel time period of the time-division-multiplex system. It ought perhaps to be mentioned here that settings of the trigger circuit T4 which occur on a call other than one to be metered on a timed basis produce no effective results. In the case of the call now being considered, as long as the link circuit is held on the call each time the reading head RH reads "1" in an element storage space $t_{3b}$ pertaining to the link circuit and a pulse $P_4$ exists the gating circuit G38 produces a stimulus on wire 59, with the result that, since a stimulus exists on wire 62 at the time, the gating circuit G40 produces a stimulus on wire 63 and therefore on the input pulse highway 108 of the metering multiplex. Correspondingly, each time the reading head RH reads "1" in an element storage space $t_{4b}$ pertaining to the link circuit and a pulse $P_8$ exists, the gating circuit G39 produces a stimulus on wire 59 and a stimulus is produced on the pulse highway 108. Where (as occurs for example when the four-digit binary number concerned happens to be written in the element storage spaces $t_{1b}$ to $t_{4b}$ of both the storage compartments pertaining to the link circuit) two or three pulses (stimuli) are produced on the pulse highway 108 in respect of a metering pulse $P_4$ of $P_8$, the two or three pulses are so close together that they, owing to the effect of the pulse lengthener L1, only produce a single metering stimulus on the metering wire 107 of the link circuit. Since the metering pulses $P_4$ have a recurrence frequency of 4 per minute and the metering pulses $P_8$ have a recurrence frequency of 8 per minute, in the first minute of metering on a timed basis the condition that the reading head RH reads "1" in an element storage space $t_{3b}$ pertaining to the link circuit at least once during the existence of a pulse $P_4$ arises four times, and the condition that the reading head RH reads "1" in an element storage space $t_{4b}$ pertaining to the link circuit at least once during the existence of a pulse $P_8$ arises eight times. Thus the number of times the calling subscriber's meter during this first minute of metering on a timed basis is $4+8=12$ as is requisite. Metering proceeds correspondingly in subsequent minutes for which the forward hold condition in respect of the call is maintained on the forward holding wire 105.

Referring now to FIG. 7, this as has already been stated is a schematic diagram, of the so-called functional type, showing the constitution and organization of the pulse generator used for supplying the pulse trains shown in FIG. 3. In this diagram, the wires 111, 105, 106, 107, and 108 are metering pulse supply wires on which are produced the metering pulses $P_0$, $P_1$, $P_2$, $P_4$, and $P_8$ respectively. The wire 110 is connected to a source of regularly recurring narrow pulses (hereinafter termed clock pulses) $G_P$ having a recurrence frequency of 32/15 per second. The wire 109 has applied to it a train of regularly recurring narrow pulses $D_P$ which are derived from the magnetic storage drum and recur at the rate of 2 per revolution of this drum. Each pulse $D_P$ occurs at a time in which the element storage spaces $t_{4b}$ of one pair of associated storage compartments have just moved out of effective association with the reading and writing heads WH and RH and the element storage spaces $t_{1a}$ of another pair of associated storage compartments are about to move into effective association with these heads. The pulse generator comprises a gating circuit G50, eight binary counting circuit elements CT10, CT11, CT12, CT13, CT14, CT15, CT16 and CT21, a trigger circuit T22, and five so-called beginning circuit elements B1, B2, B3, B4, and B5. Each of the beginning circuit elements B1 to B4 serves to produce, in response to a stimulus on its input wire, a stimulus on its output wire which starts when the stimulus on the input wire starts and lasts for about 25 milliseconds. The beginning circuit element B5 serves correspondingly except that the duration of a stimulus on its output wire 101 is only 5 microseconds. The eight binary counting circuit elements are all arranged for cyclic operation. As will be clear from the figure, the seven binary counting circuit elements CT10 to CT16 are connected in chain formation. Each time a pulse $G_P$ occurs the trigger circuit T22 is set to its operated condition in which it produces a stimulus on wire 102. The first pulse $D_P$ to occur after this causes the gating circuit G50 to produce a stimulus on wire 103, with the result that the binary counting circuit element CT21 is set to its "1" condition in which it produces a stimulus on the metering pulse supply wire 111. The immediately following pulse $D_P$ also causes the gating circuit G50 to produce a stimulus on wire 103, with the result in this instance that the binary counting circuit element CT21 is reset to its "0" condition in which it produces a stimulus on wire 104 and no stimulus on wire 111. In response to the re-appearance of a stimulus on wire 104, the beginning element B5 produces a stimulus on wire 101 with the result that the trigger circuit T22 is reset to its normal condition in which no stimulus appears on wire 102. Thus each time a pulse $G_P$ occurs the trigger circuit T22 and binary counting circuit element CT21 are caused to go through a complete cycle of operation, this cycle being such that a stimulus is applied to the metering pulse supply wire 111 on the occurrence of a pulse $D_P$ derived from the magnetic storage drum, and is removed one half a revolution of the drum later on the occurrence of the next pulse $D_P$. In this way pulses $P_0$ of requisite duration, timing, and recurrence frequency are produced on the metering pulse supply wire 111. In response to every other pulse on wire 111, the binary counting circuit element CT10 produces a stimulus on wire 112, with the result that the condition of the binary counting circuit element CT11 is changed. In response to every fourth pulse on wire 111, the binary counting circuit element CT11 produces a stimulus on wire 113, with the result that the condition of the binary counting circuit element CT12 is changed. In response to every eighth pulse on wire 111, the binary counting circuit element CT12 produces a stimulus on wire 114, with the result that the condition of the binary counting circuit element CT13 is changed. Thus in response to every sixteenth pulse $P_0$, i.e. $(32/15\times60)$ divided by $16=8$ times per minute, the binary counting circuit element CT13 produces a stimulus on wire 118, and thereby causes the beginning circuit element B1 to produce a stimulus on wire 108 for about 25 milliseconds. In this way pulses $P_8$ of requisite duration, timing and recurrence frequency are produced on the metering pulse supply wire 108. In the middle of the interval between each pair of consecutive pulses $P_8$, the binary counting circuit element CT13 is set to its "1" condition in which it produces a stimulus on wire 115, with the result that the condition of the binary counting circuit element CT14 is changed. Thus in response to every thirty-second pulse $P_0$, i.e. $(32/15\times60)$ divided by $32=4$ times per minute, the binary counting circuit element CT14 produces a stimulus on wire 119, and thereby causes the beginning circuit element B2 to produce a stimulus on wire 107 for about 25 milliseconds, this stimulus commencing in the middle of the interval between two consecutive pulses $P_8$. In this way pulses $P_4$ of requisite duration, timing, and recurrence frequency are produced on the metering pulse supply wire 107. Correspondingly, in the middle of the interval between each pair of consecutive pulses $P_4$ the binary counting circuit element CT14 produces a stimulus on wire 116 so that twice per minute the binary counting element CT15 produces a stimulus on wire 120 and a pulse $P_2$ is produced on the metering pulse supply wire 106, and in the middle of the interval between each pair of consecutive pulses $P_2$ the binary counting circuit element CT15 produces a stimulus on wire 117 so that once per minute the binary counting circuit element CT16 produces a stimulus on wire 121 and a pulse $P_1$ is produced on the metering pulse supply wire 105.

What I claim is:

1. In an automatic exchange system, a multi-compartment storage device having a plurality of effectively separate storage compartments each capable of storing metering information constituted by a plurality of binary digits and signifying the call metering action requisite with respect to a call, there being at least one such storage compartment for and individual to each of a plurality of paths through the exchange, common selection-controlling apparatus dealing with calls one at a time and used in the setting up of all calls over said plurality of paths and furnishing said metering information with respect to each such call, a plurality of signal wires effectively common as a whole to all of said plurality of paths and outgoing from said common selection-controlling apparatus for conveying from this apparatus said metering information furnished by it with respect to a call, means for entering binary digits into storage in said multi-compartment storage device, and coupling means, responsive to a momentary signal condition appearing on and indicative of the particular one of said plurality of paths appropriated for a call currently being dealt with by said common selection-controlling apparatus, for actively associating said plurality of signal wires with a said storage compartment individual to this particular path to effect the storage in this storage compartment of said metering information furnished by said common selection-controlling apparatus with respect to the call, said coupling means comprising a plurality of gating circuits coupling said plurality of signal wires to said means for entering binary digits into storage.

2. In an automatic exchange system, a multicompartment storage device having a plurality of effectively separate storage compartments each capable of storing metering information constituted by a plurality of binary digits and signifying the call metering action requisite with respect to a call, there being at least one such storage compartment for and individual to each of a plurality of paths through the exchange, a common marker dealing with calls one at a time and used in the setting up of all calls over said plurality of paths and furnishing said metering information with respect to each such call, a plurality of signal wires effectively common as a whole to all of said plurality of paths and outgoing from said common marker for conveying from this marker said metering information furnished by it with respect to a call, means for entering binary digits into storage in said multi-compartment storage device, and coupling means, responsive to a momentary signal condition appearing on and indicative of the particular one of said plurality of paths appropriated for a call currently being dealt with by said common marker, for actively associating said plurality of signal wires with a said storage compartment individual to this particular path to effect the storage in this storage compartment of said metering information furnished by said common marker with respect to the call, said coupling means comprising a plurality of gating circuits coupling said plurality of signal wires to said means for entering binary digits into storage, and said momentary signal condition being constituted by the coincidence of a momentary marking signal applied to the particular path by said common marker and a continuous hold signal on this path.

3. In an automatic exchange system, a magnetic storage drum having a plurality of storage compartments each capable of storing metering information constituted by a plurality of binary digits and signifying the call metering action requisite with respect to a call, there being at least one such storage compartment for and individual to each of a plurality of paths through the exchange, a writing head of said magnetic storage drum, a control circuit for controlling said writing head, a time-division-multiplex system synchronized with said magnetic storage drum and including multiplexes for associating said storage compartments with the respective ones of said plurality of paths, common selection-controlling apparatus dealing with calls one at a time and used in the setting up of all calls over said plurality of paths and furnishing said metering information with respect to each such call, a plurality of signal wires effectively common as a whole to all of said plurality of paths and outgoing from said common selection-controlling apparatus for conveying to said control circuit said metering information furnished by said common selection-controlling apparatus with respect to a call, and coupling means in said control circuit, responsive to a momentary signal condition indicative of the particular one of said plurality of paths appropriated for a call currently being dealt with by said common selection-controlling apparatus, for actively associating said plurality of signal wires with said writing head during a channel time period of said time-division-multiplex system allocated to this particular path to effect the storage in a said storage compartment individual to this particular path of said metering information furnished by said common selection-controlling apparatus with respect to the call, said coupling means comprising a plurality of gating circuits coupling said plurality of signal wires to said writing head.

4. In an automatic exchange system, a magnetic storage drum having a plurality of storage compartments each capable of storing metering information constituted by a plurality of binary digits and signifying the call metering action requisite with respect to a call, there being at least one such storage compartment for and individual to each of a plurality of paths through the exchange, a writing head of said magnetic storage drum, a control circuit for controlling said writing head, a time-division-multiplex system synchronized with said magnetic storage drum and including multiplexes for associating said storage compartments with the respective ones of said plurality of paths, a common marker dealing with calls one at a time and used in the setting up of all calls over said plurality of paths and furnishing said metering information with respect to each such call, a plurality of signal wires effectively common as a whole to all of said plurality of paths and outgoing from said common marker for conveying to said control circuit said metering information furnished by said common marker with respect to a call, and coupling means in said control circuit, responsive to a momentary signal condition indicative of the particular one of said plurality of paths appropriated for a call currently being dealt with by said common marker, for actively associating said plurality of signal wires with said writing head during a channel time period of said time-division-multiplex system allocated to this particular path to effect the storage in a said storage compartment individual to this particular path of said metering information furnished by said common marker with respect to the call, said coupling means comprising a plurality of gating circuits coupling said plurality of signal wires to said writing head, and said momentary signal condition being created by the coincidence of a momentary marking signal applied to the particular path by said common marker and a continuous hold signal on this path.

5. In an automatic exchange system, a magnetic storage drum having a plurality of storage compartments each capable of storing metering information constituted by a plurality of binary digits and signifying the call metering action requisite with respect to a call, there being at least one such storage compartment for and individual to each of a plurality of paths through the exchange, a metering wire in each said path, a writing head of said magnetic storage drum cooperating with said storage compartments, a reading head of said magnetic storage drum cooperating with said storage compartments, a first control circuit for controlling said writing head, a second control circuit controlled by said reading head for controlling the application of metering pulses to said metering wires of said plurality of paths in accordance with information read by this reading head and for controlling said writing head by way of said first control circuit, a time-division-multiplex system synchronized with said magnetic storage drum and including multiplexes for associating said storage compartments with respective ones of said plurality of paths, a common marker dealing with calls one at a time and used in the setting up of all calls over said plurality of paths and furnishing said metering information with respect to each such call, a plurality of signal wires effectively common as a whole to all of said plurality of paths and outgoing from said common marker for conveying to said first control circuit said metering information furnished by said common marker with respect to a call, and coupling means in said first control circuit, responsive to a momentary signal condition indicative of the particular one of said plurality of paths appropriated for a call currently being dealt with by said common marker, for actively associating said plurality of signal wires with said writing head during a channel time period of said time-division-multiplex system allocated to this particular path to effect the storage in a said storage compartment individual to this particular path of said metering information furnished by said common marker with respect to the call, said coupling means comprising a plurality of gating circuits coupling said plurality of signal wires to said writing head, and said momentary signal condition being created by the coincidence of a momentary marking signal applied to the particular path by said common marker and a continuous hold signal on this path.

References Cited in the file of this patent

UNITED STATES PATENTS

| | | |
|---|---|---|
| 2,700,148 | McGuigan et al. | Jan. 18, 1955 |
| 2,767,246 | Retallack | Oct. 16, 1956 |
| 2,782,256 | Malthaner | Feb. 19, 1957 |
| 2,796,596 | Kenosian | June 18, 1957 |
| 2,805,286 | Baker | Sept. 3, 1957 |
| 2,850,571 | Bray et al. | Sept. 2, 1958 |